Feb. 9, 1960
J. A. BURKE, JR
2,924,409
PARACHUTE DEVICE
Filed Dec. 6, 1956
2 Sheets-Sheet 1
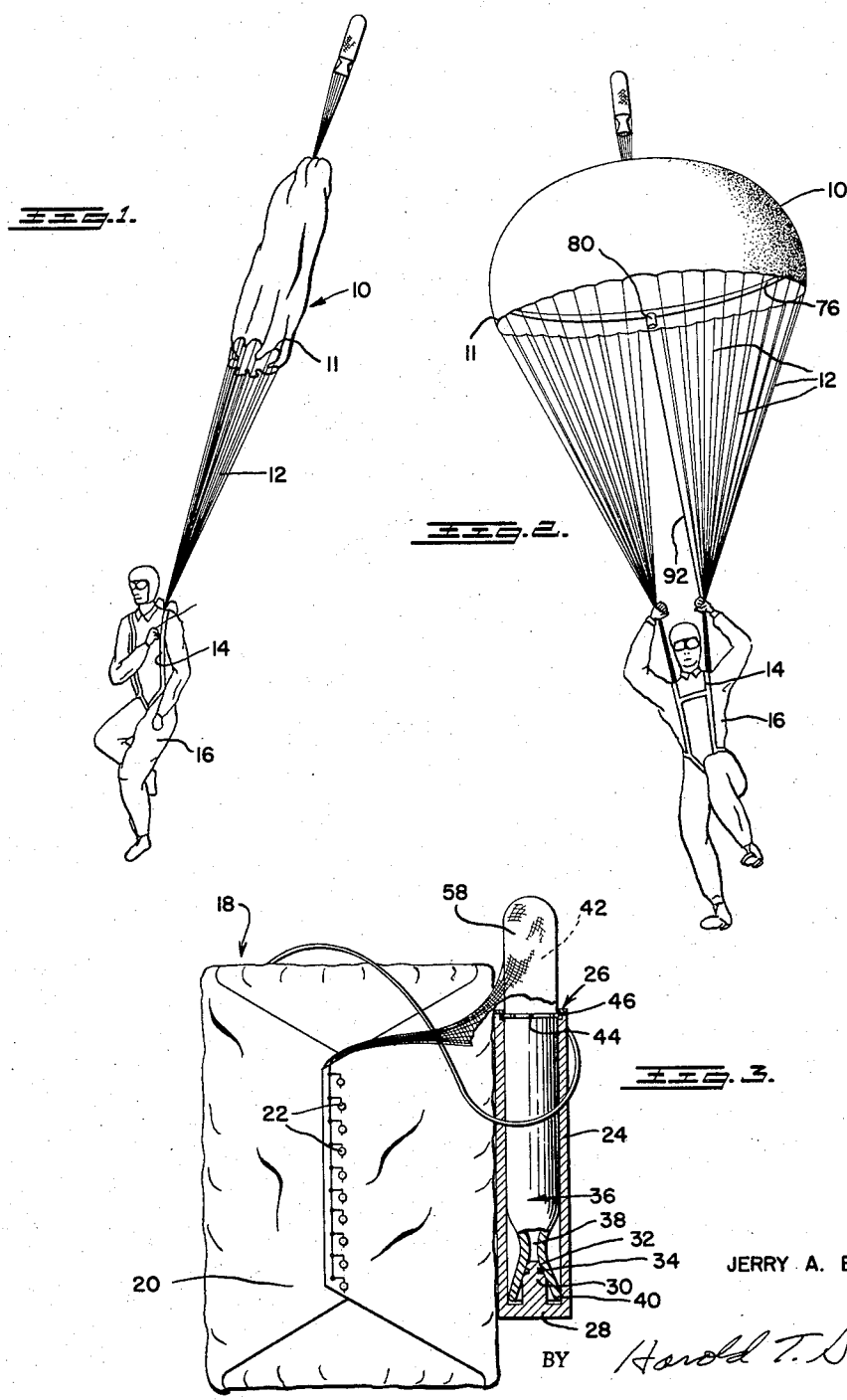
INVENTOR
JERRY A. BURKE, Jr.
BY Harold T. Stowell
ATTORNEY Feb. 9, 1960   J. A. BURKE, JR   2,924,409
PARACHUTE DEVICE
Filed Dec. 6, 1956   2 Sheets-Sheet 2
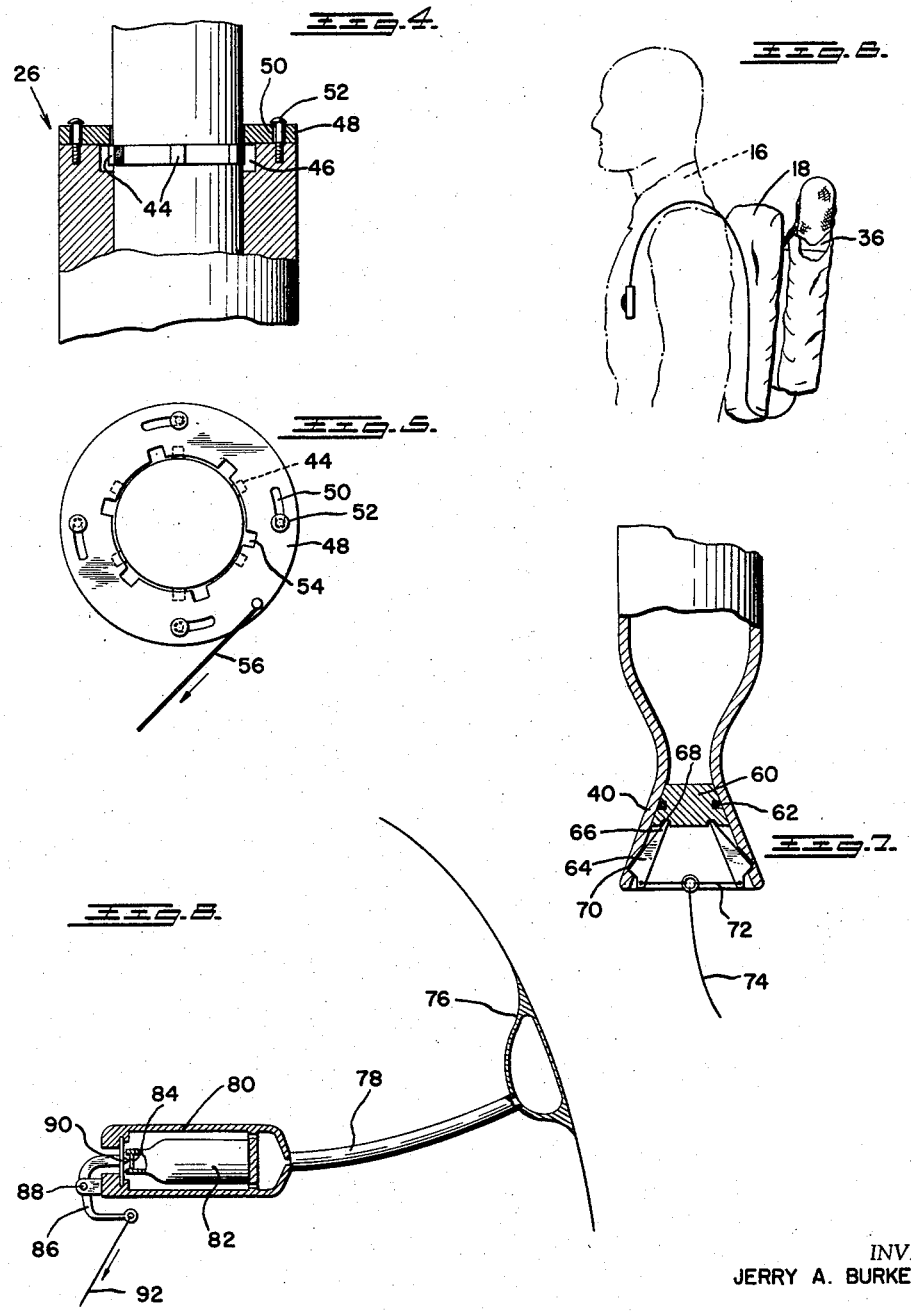
INVENTOR
JERRY A. BURKE, Jr.
BY *Harold T. Stowell*
ATTORNEY

# United States Patent Office 2,924,409
Patented Feb. 9, 1960

2,924,409

PARACHUTE DEVICE

Jerry A. Burke, Jr., Richmond, Va., assignor to Experiment Incorporated, Richmond, Va., a corporation of Virginia Application December 6, 1956, Serial No. 626,763

3 Claims. (Cl. 244—149)

The present invention relates to the parachute art and specifically to apparatus for increasing the speed and efficiency of parachute opening.

Parachutes typical of conventional construction are known to require a minimum altitude of about 500 feet to safely allow for free fall opening and deceleration in the lowering of personnel and equipment. Devices have been devised to detachably couple parachutes to flying aircraft whereby the movement of the aircraft and the parachute wearer serve to increase the speed of parachute opening and permit safe parachute use at altitudes as low as about 300 feet.

It is therefore a general object of the present invention to provide a unique parachute construction and assembly which can be effectively and safely utilized at extremely low altitudes which will function effectively to permit safe descent of personnel and equipment from points of fall originating below 300 feet. There is a pressing and essential need for such a parachute construction in view of present day operation of small helicopters and flying platforms which are predominantly low altitude aircraft.

Another object of this invention is the provision of a parachute assembly and construction which provides for sufficiently quick opening of the chute to enable personnel to safely descend from altitudes as low as about 10 feet.

It is a further object of this invention to provide a quick opening parachute assembly and construction which operates in such a manner that free fall is limited to only several feet before being arrested by chute operation.

Still another object is the provision of a new and improved parachute construction and assembly which is rendered quick-opening by construction and arrangement which requires a minimum of drag force to open and fill the chute.

Still a further object of the invention is the provision of a parachute construction which is effective and efficient in use affording a maximum factor of safety for personnel and equipment utilizing the chute.

It is still another object of this invention to provide a new and unique chute construction and assembly which is extremely simple and inexpensive in design and construction to permit said chute to be furnished at a low initial cost with a minimum cost of operation and use.

Still further objects and advantages of this invention will become more readily evident to one skilled in the art when the following description is read in the light of the accompanying drawings in which:

Fig. 1 is a pictorial illustration of the new parachute construction in one stage of opening;

Fig. 2 is a view similar to Fig. 1 illustrating the parachute in an open condition;

Fig. 3 is an elevational view in partial vertical section of the parachute assembly and associated opening apparatus;

Fig. 4 is an enlarged fragmentary sectional elevation of a portion of the parachute opening apparatus shown in Fig. 3;

Fig. 5 is a top plan view of the opening apparatus shown in Fig. 3;

Fig. 6 is a pictorial view illustrating the parachute attached to a wearer;

Fig. 7 is an enlarged fragmentary sectional elevation illustrating a modified form of the construction of the opening apparatus shown in Fig. 3; and Fig. 8 is a sectional elevation illustrating an additional component of the parachute opening apparatus.

The nature of the present invention may be stated in general terms as relating to a quick-opening parachute construction which includes a semi-spherical parachute or canopy, a harness apparatus for attachment to personnel, shroud lines interconnecting the harness with the annular open end of the semi-spherical canopy, a reaction propulsion device secured to the top central portion of the canopy, quick releasable means for actuating said device, an inflatable ring about the annular open end of the semi-spherical canopy, a source of compressed fluid carried on the harness, and quick releasable means for opening communication between said source of compressed fluid and said inflatable ring.

Referring to Figs. 1–3 of the drawings there is illustrated a quick opening parachute asesmbly and construction which consists of a typical semi-spherical parachute 10 having an open air receiving end 11. Plural shroud lines 12 connect the annular edge of the open end 11 of the parachute to a harness member 14 adapted to be worn about the torso of a user of the parachute designated at 16.

In the present construction the parachute 10 and shroud lines 12 are normally housed in quick-opening folded condition in a pack or container 18 secured to and forming a part of the user's harness 14 to be typically located and supported on the user's back. The pack container 18 is provided with flap portions 20 which are secured by quick releasable fasteners 22 in end enclosing condition at one end of the container.

A cylindrical tube 24 is secured on the back or on the container 18 in a normally vertically arranged position presenting an upwardly disposed open end 26 therein. The bottom end 28 of the tube is closed and carries a vertically projecting cylindrical post 30 centrally thereof. The upper end of post 30 is tapered as at 32 and carries an O ring seal 34 thereabout at a spaced distance below the upper end of the post for purposes to be hereinafter described.

A cylindrical shell 36, having a restricted opening 38 in its rearward end bounded by an annularly flared rearwardly extending, integrally formed tail piece 40, is slidably inserted rearwardly and downwardly in the cylindrical tube 24 to bring the post member 30 in an upwardly inserted position in the flared tail piece 40 of the shell closing the restricted opening 38 therein with the O ring 34 sealing the closure formed thereby.

The upwardly disposed nose portion 42 of the reaction propulsion device, as more clearly shown in Figs. 4 and 5, projects from the upper open end 26 of the cylindrical tube 24. A plurality of radially extending lugs 44 are provided in spaced relationship about the circumference of the shell immediately adjacent the upper open end 26 of the tube 24. The open end 26 of the tube is provided with an annular recess 46 adapted to receive the lugs 44, and with a flat circular ring 48 having a series of arcuate slots 50 therethrough. The ring is affixed to the upper end of the tube by threaded pins 52 secured one through each of the slots 50 into the upper end of the tube 24. The flat ring 48 is provided about its inner circumference with radial cut-outs 54 corresponding in configuration and spacing to the lugs 44 on the rocket shell 36.

By the foregoing construction, the shell 36 may be inserted downwardly into the tube 24 with the lugs 44 on the shell passing vertically through the cut-outs 54 in the ring 48 to bring the lugs below the underside of the ring within the recess 46 in the tube. To lock the shell 36 in place the ring 48 is rotated to an extent limited by movement of the arcuate slots 50 with respect to the pins 52 projecting therethrough which is sufficient to offset the cut-outs 54 vertically from the lugs 44 thereby vertically retaining the shell within the tube. A rip lanyard 56 is secured at one end to the ring 48 adjacent its peripheral edge with the second end of the lanyard being disposed in a position available to the user of the chute for purposes to be hereinafter described.

As is best seen in Figs. 1 through 3 a flexible hood 58 is secured over the nose portion 42 of the device with the extended portions of the hood rearwardly of the nose portion having attachment to the upper outer central dome portion of the parachute and to the releasable fasteners 22 on the container 18.

In the operation of the parachute assembly hereinbefore described, the shell 36 is filled with a fuel, preferably an inert gas generating substance such as solid $CO_2$, prior to its positioning within the tube 24. At time of desired operation of the chute the wearer is required only to pull the rip lanyard 56 sufficient to rotate the ring 48 to vertically align the cut-outs 54 in the ring with the lugs 44 on the shell. When the ring has been moved to this aforedescribed position the reaction propulsion device will blast out of the tube 24 under the influence of its compressed fuel causing the chute to rip out of the pack through the quick releasable opening lifting the parachute rapidly upwardly to a position wherein it will be quickly snapped open by drag currents or where desired by an additional quick opening component of the present invention to be hereinafter described.

In Figs. 6 and 7 of the drawings, a modified construction of the assisting reaction propulsion device is shown wherein the modification pertains to the manner of sealing the device in a closed condition and to initiating its action by a modified release mechanism. In this modification the device is supported on the pack worn by the user in substantially the same manner as hereinbefore described. However, the sealing post 30 within the tube 24 in eliminated and a cylindrical tapered plug 60 having an O ring seal 62 annularly about the outer tapered face thereof is inserted upwardly in the flared tail piece 40 of the shell. A pair of triangular wedge members 64 are positioned within the tail pieces rearwardly of the plug 60 with one tip 66 of each of the wedges engaging in a detent 68 in the rearward face of the plug and a second tip of each of the wedges engaging in a notched groove 70 formed annularly within the open end of the tail piece 40 rearwardly of the plug. For the purpose of releasing the device the wedge members 64 are interconnected by a flexible coupling cord or cable 72 radially of the open tail piece and a rip lanyard 74 is secured to the flexible cable 72 intermediate its length and intermediate the wedge members 64.

By the foregoing construction the user may pull the rip lanyard 74 which in turn, through coupling 72, will pull wedge members 64 toward one another and away from and free of their engagement in the annular groove 70 within the tail piece allowing the compressed fuel within the shell 36 to blow the plug rearwardly and outwardly of the tail piece and at the same time blasting the device outwardly of its supporting tube to elevate the parachute in the manner hereinbefore described.

In Fig. 8 of the drawings there is disclosed an additional quick opening component which may be utilized in combination with the constructions hereinbefore described which auxiliary and combined component consists of a flexible, gas impervious sealed ring 76 secured annularly about the inner face of the parachute adjacent the open end 11 (Fig. 2). The flexible ring 76 is provided with a flexible tube 78 which communicates with a cylindrical housing 80 normally supported on the harness or the parachute. The housing 80 contains therein a cylinder 82 of a compressed fluid such as air, $CO_2$ or the like which cylinder has a rupture type closure 84 in one end thereof. An arm 86 is pivotally supported as at 88 on one end of the housing 80 and is provided with a pin end 90 extending through an end enclosing seal of the housing to terminate in close proximity to the cylinder closing disc 84. A lanyard 92, Figs. 2 and 8, is connected to the pivoted arm 86 in such a manner that a pull of the lanyard brought about when the parachute is extracted from its pack by the reaction propulsion device, causes pin 90 to rupture disc 84 admitting the compressed fluid within the cylinder to the flexible ring 76 through coupling 78 causing inflation of the flexible ring 76 with said compressed fluid.

Inflation of the ring causes the open end of the chute to snap outwardly assuming a spherical configuration thereby opening the chute quickly for reception of sustaining air therein.

By way of example illustrating an operative embodiment of the invention, a reaction propulsion device of about 8 inches in diameter and having an over-all length of about 21 inches containing $CO_2$ at 2,000 p.s.i. at 70 degrees F. will lift a 50 pound parachute to an elevation of 50 feet in one-half second.

It has additionally been discovered that a parachute assembly having an inflatable ring within the canopy, wherein the chute diameter is 25 feet and the ring diameter (inflated) is 4 inches, about .14 cubic foot of $CO_2$ at 2,500 p.s.i. in the storage cylinder will function in the desired and improved manner hereinbefore described relative to opening of the parachute after it has been extended by the assisting device. Using a parachute assembly corresponding to the specifications of the examples above set forth, the parachute may be effectively employed from a minimum altitude of about 9 or 10 feet. This unique and unexpected result is made possible by the fact that the assisting reaction propulsion device causes an elevation of the parachute from its point of activation.

From the foregoing disclosure it is seen that a combination of an assisting reaction propulsion device and a chute opening component is employed to produce a unique and novel parachute assembly which serves to function in an improved and useful manner producing substantially new and unexpected results to the ultimate benefit and safety of parachute users.

While the present invention has been described in reference to a parachute wherein the launching device is carried on the parachute pack, it is evident that the device or the parachute and the device may be separately supported on a portion of the aircraft or flying platform, such as on an ejection seat to which the user is secured by conventional seat belts.

I claim:

1. A parachute, a pack for said parachute, shroud lines interconnecting said parachute and said pack, a reaction propulsion device including a body shell having an outlet nozzle, compressed gas within said shell, said shell including plug means for maintaining said compressed gas within said shell, means attaching said reaction propulsion device to said parachute, and manually operable release means carried by said device for releasing said plug means from said device to thereby allow said compressed gas to issue from the outlet nozzle of said shell thereby causing said reaction propulsion device to pull said parachute out of said pack in the direction of travel of said shell.

2. In combination with a parachute, a parachute opening assistant comprising a reaction propulsion device secured to said parachute, said reaction propulsion device including a body shell having an outlet nozzle, a compressed gas within said shell, means retaining said compressed gas within said shell, said means including a seating plug engaging said shell and retaining said gas therein, and releasable mechanism for effecting discharge of said gas from said shell, said mechanism including a quick releasable hold-down member retaining said shell seated on said plug against the discharge forces of said gas acting against said plug.

3. In combination with a parachute, a parachute opening assistant comprising a reaction propulsion device secured to said parachute, said device including a body shell having an outlet nozzle, a compressed gas within said shell, a plug releasably disposed within the outlet nozzle of said shell, support means for holding said plug within the outlet nozzle of said shell against the discharge forces of said gas, and means for effecting discharge of said gas, said means including a quick release mechanism for removing said support means from said plug allowing said gas to discharge from said shell.

References Cited in the file of this patent

UNITED STATES PATENTS

| | | |
|---|---|---|
| 1,906,091 | Pendergest et al. | Apr. 25, 1933 |
| 2,502,470 | Martin | Apr. 4, 1950 |
| 2,759,693 | Gross | Aug. 21, 1956 |